Aug. 1, 1950
W. J. GIESE
2,517,300
GRAIN LOADER ATTACHMENT FOR VEHICLES
Filed July 1, 1947
2 Sheets-Sheet 1
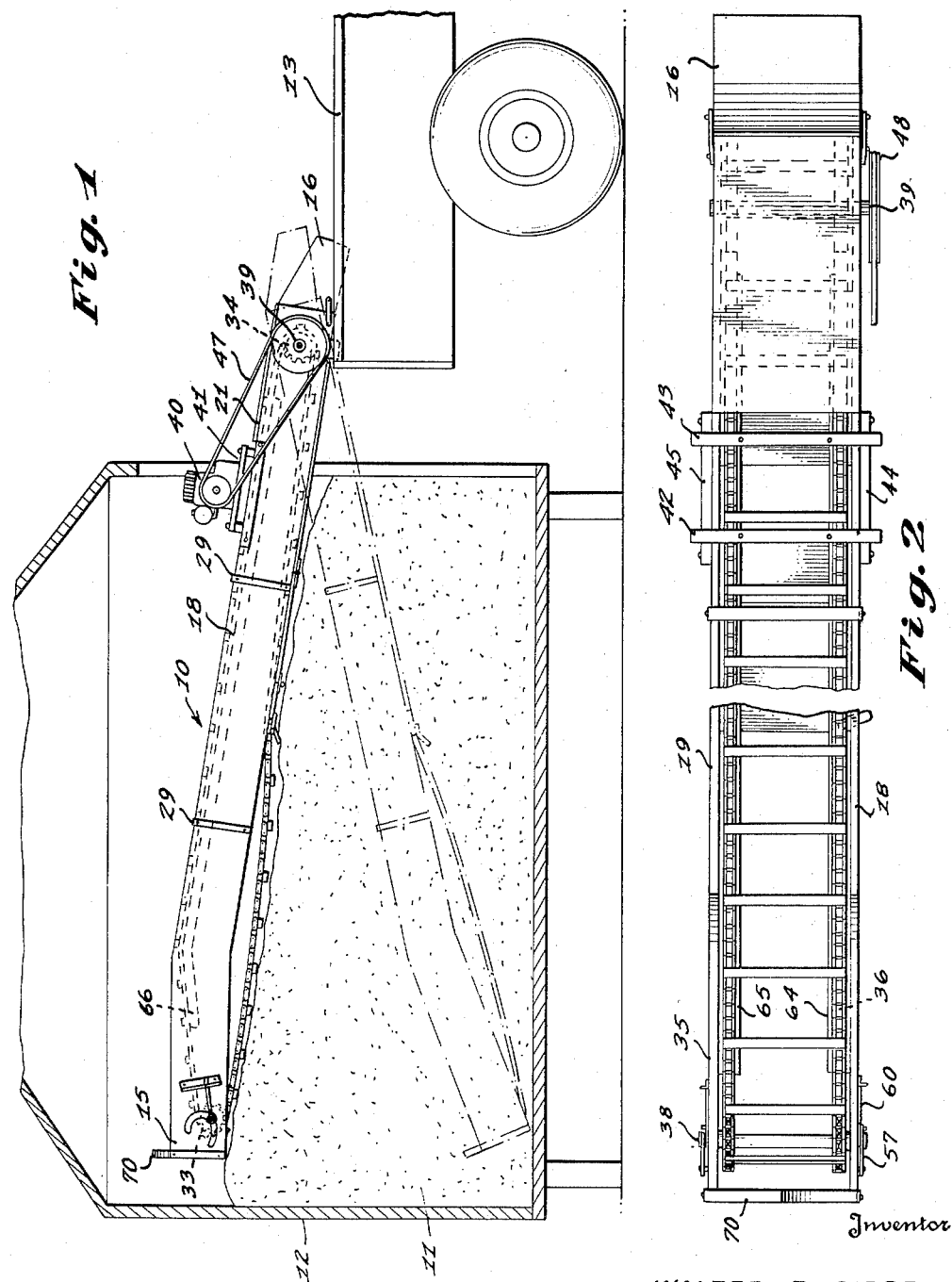
Inventor
WALTER J. GIESE
By McMorrow, Berman & Davidson
Attorneys

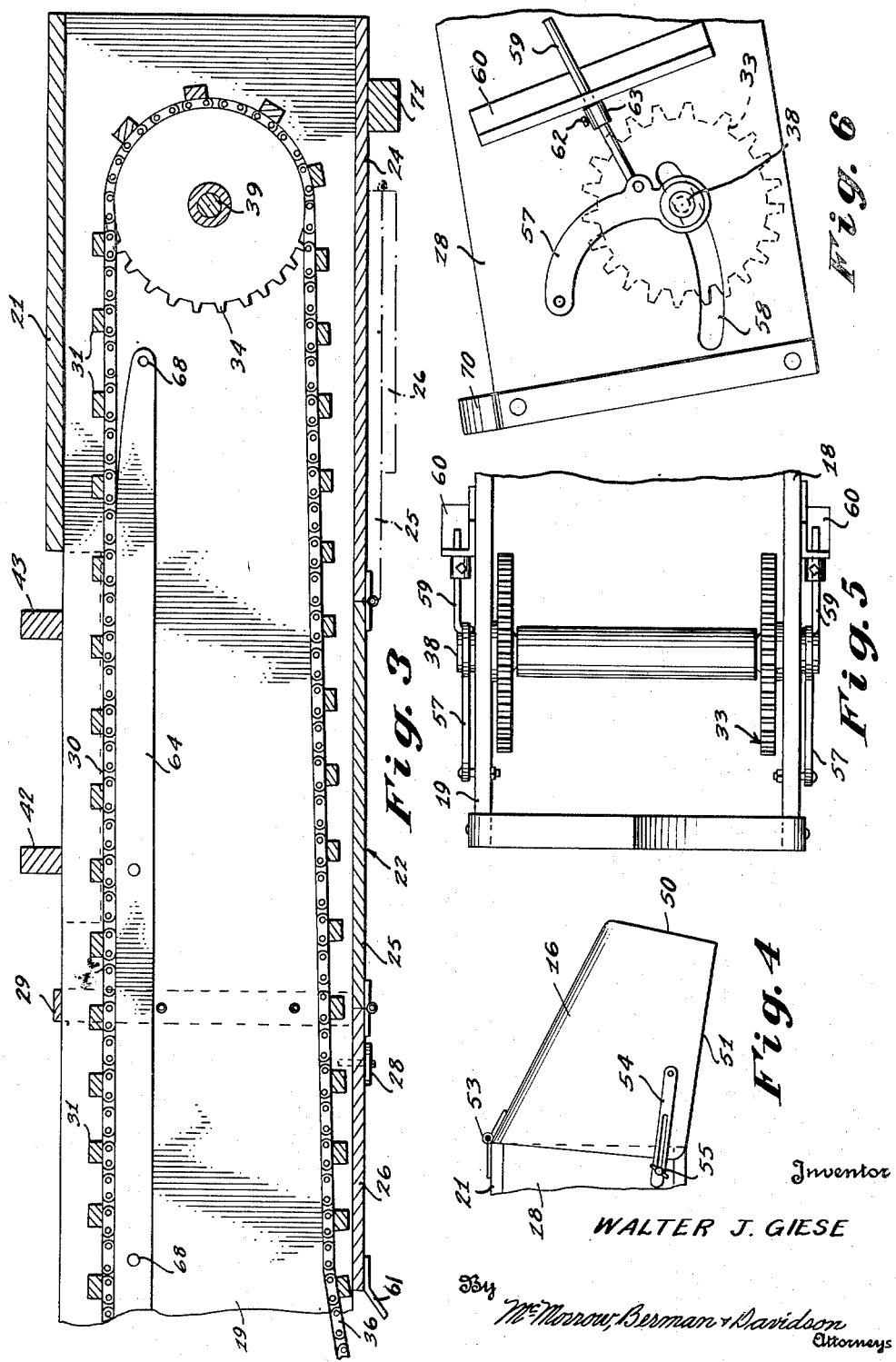

Patented Aug. 1, 1950

2,517,300

UNITED STATES PATENT OFFICE 2,517,300

GRAIN LOADER ATTACHMENT FOR VEHICLES

Walter J. Giese, Power, Mont.

Application July 1, 1947, Serial No. 758,238

4 Claims. (Cl. 198—168)

1

This invention relates to a grain loader, and more particularly to a portable grain loader for handling loose materials in bulk, such as grains, and is particularly adaptable for use in loading or unloading railroad cars, granaries, and the like.

It is the particular object of the invention to construct a device of the type described, that will be easily portable.

Another object of the invention is to construct a device of the type described that when used in unloading grain will automatically dig itself down until all the material has been moved.

Other objects will appear to those skilled in the art from a reading of the following specification.

The drawings illustrate a preferred embodiment of the invention, but it is understood that modifications may be made therein without departing from the spirit of the invention as hereinafter claimed.

While the invention is designated a grain loader, it is understood that it may be used equally well with coal, broken stone, sand, granulated sugar, and similar comminuted materials.

Figure 1 represents a side elevation of the portable conveyor, when used in unloading grain from a granary to a vehicle.

Figure 2 is a fragmentary top plan view of the structure of Figure 1, on an enlarged scale.

Figure 3 is a vertical longitudinal section through the device, on an enlarged scale.

Figure 4 is an elevation of the unloading end of the conveyor.

Figure 5 is a top plan view of the loading or inlet end of the conveyor.

Figure 6 is an elevation of the structure shown in Figure 5.

The conveyor or unloader 10 is designed to unload grain 11 in a granary 12 into a vehicle 13. The device 10 comprises a chute having a loading or inlet end 15 and a discharge or unloading end 16. The device is generally of rectangular shape in cross section, and is of the proper size to be handled easily and to move the grain 11 at the desired rate.

The loader or conveyor 10 comprises two side walls 18 and 19, a fragmentary top wall 21 adjacent the discharge end 16, and a fragmentary bottom wall 22 extending from the discharge end 16 to substantially the mid-portion thereof to thereby form an opening for a purpose to be subsequently described. The bottom wall 22 comprises three sections, a fixed section 24 adjacent the discharge end 16, and two sections 25 and 26 that are hinged so as to be foldable about the fixed section 24, as indicated in Figure 3 of the drawings. When expanded, the sections 25 and 26 are held in place within the side walls 18 and 19 by means of one or more angular clamps 28 that are pivoted to the side walls 18 and 19 and are movable with respect thereto to grip the foldable sections 25 and 26 in place. The side walls 18 and 19 may be reinforced and positioned by means of two or more inverted U-shaped brackets 29.

An endless conveyor belt 30 is positioned within the device 10 and is adapted to run longitudinally thereof. Attached to the surface of the belt 30 is a series of transverse spades or buckets 31 of any desired shape, designed to move the material. A pair of sprockets 33 and 34 mounted upon respective shafts, serve to support the belt 30. The belt 30 has two sprocket chains 35 and 36 attached thereto that are adapted to mesh with the sprockets 33 and 34. The shafts 38 and 39 of the sprockets 33 and 34, respectively, are journaled in the side walls 18 and 19, and project therefrom, for a purpose to be described more particularly hereinafter.

A motor 40, that may be either gasoline or electric, is fastened on a platform 41 supported on two transverse braces 42 and 43 on the upper edges of the side walls 18 and 19, in back of the top wall 21. These braces 42 and 43 are adjustable longitudinally of the loader 10, and for this purpose two runners 44 and 45 are secured to the ends of the braces 42 and 43 and are adapted to slide along the upper edges of the side walls 18 and 19. These runners 44 and 45 project beyond the side walls 18 and 19, as indicated most clearly in Figure 2 of the drawings, to prevent lateral dislodgment of the platform 41 and the motor 40. A power belt 47 runs from the motor 40 to a pulley 48 fixed on the projection of the sprocket shaft 39 that is outside of the side wall 18, to provide motor power for the conveyor belt 30.

The discharge member 16 of the loader 10 has an open longitudinal end 50 and open bottom 51. The discharge member 16 is pivotable with respect to the main body of the loader 10, and for this purpose is provided with a horizontal hinge 53 at its upper surface. The sides of the discharge member 16 lie outside the side walls 18 and 19 of the main portion of the loader 10, so that pivotal movement of the discharge member 16 is not impeded. A slotted plate 54 is hinged to the discharge member 16, and a set screw 55 secured in the side wall 18 passes through the slot in the plate 54 and may be tightened to hold the discharge end 16 in any desired position with respect to the body of the loader 10.

The shaft 38 of the sprocket 33 at the inlet end of the loader 10 is carried on two curved brackets 57 horizontally pivoted to the side walls 18 and 19 on the outside thereof. The side walls 18 and 19 are further provided with arcuate slots 58 concentric with the pivots of the brackets 57, so that the shaft 38 may be moved back and forth through the slot 58 to provide proper tensioning of the conveyor belt 30. To hold the shaft 38 in such adjusted position, the brackets 57 are supplied with rods 59 pivoted thereto and passing through a suitable aperture in frames 60 fixed to the side walls 18 and 19. A set screw 62 and sliding sleeve 63 movable with respect to the rod 59 cooperate with the frames 60 to keep each rod 59 in position.

The inlet end of the loader 10 is angularly positioned with respect to the main body of the loader 10 so that the endless conveyor belt 30 projects beneath the side walls 18 and 19 where there is no bottom wall 22. As a result, the comminuted material 11 will be exposed to the action of the buckets 31 on the under side of the bottom strand of the endless belt 30. In operation, therefore, the inlet end 15 of the loader 10 may be positioned anywhere on top of the pile of material 11, and the conveyor belt 30 will dig itself down to the bottom of the pile.

As shown in Figure 1 of the drawings, the conveyor belt 30 operates counter-clockwise. The free end of the section 26 of the bottom wall 22 may be provided with a lip 61 to properly guide the loaded lower strand of the belt 30 as it enters the interior of the loader 10. A pair of guides 64 and 65 are fastened to the upper portions of the side walls 18 and 19 to properly guide the upper unloaded strand of the conveyor belt 30 as it travels from right to left toward the loading end 15. That portion 66 of each upper guide 64 and 65 near the inlet end 15 is bent or curved to reduce friction and to assure smooth operation of the conveyor belt 30 as it engages the sprocket 33. The guides 64 and 65 are positioned on horizontal pins 68, which may be adjustable with respect to the side walls 18 and 19.

The inlet end 15 of the loader 10 is provided with a handle 70 to facilitate carrying and positioning the loader 10.

In the operation of the device, the inlet end 15 is positioned on top of the granular material 11 in a warehouse or box car 12, so that the discharge end or member 16 projects over or into the vehicle 13. The motor 40 is then started. The sprockets 34 will be actuated to move the sprocket chains 35 and 36, and the lower run of the belt 30 with its scoops or buckets 31 will travel through the opening in the bottom wall 22 and in its course of such travel will excavate the material 11 and carry it around under its lower surface to be discharged through the end 16. A cleat 71 may aid in positioning the loader 10 with respect to the window sill or door sill of the structure 12.

The discharge end 16 of the loader 10 may be angularly positioned with respect to the main body thereof, as hereinbefore mentioned, and the shaft 38 of the sprocket 33 may also be adjusted in the slots 58 to provide the proper tension for the conveyor belt 30. Also, the motor 40 may be moved longitudinally of the device on top of the side walls 18 and 19, depending on the size of the power belt 47. To obtain access to the bottom of the loader 10, it is merely necessary to swing the catch 28 about its side wall, and fold the sections 26 and 25 about their hinges on the fixed section 24 of the bottom 22.

I claim:

1. A portable loader, comprising two side walls, a partial bottom wall, the said bottom wall including a plurality of hinged sections, means for holding the said sections in expanded position within the side walls, two horizontal shafts, means for supporting the horizontal shafts at the respective ends of the side walls, a sprocket on each shaft, an endless conveyor trained on the said sprockets, means for varying the distance between the said shafts to tension the conveyor, a motor mounted on top of the side walls for actuating one of the sprockets to drive the conveyor, the said motor being adjustable with respect to the side walls, the side walls being angularly positioned with respect to the line joining the sprockets, whereby a portion of the conveyor extends below the bottom edges of the side walls to engage the material to be loaded, and means at the discharge end of the loader for varying the angle of the said discharge end with respect to the main body of the loader.

2. A portable conveyor comprising a rectangular chute having an inlet end and a discharge end, shafts extending transversely through said chute, one near the inlet and one near the discharge end of the latter, a pair of sprockets on each shaft, an endless conveyor belt disposed around said sprockets and supported thereby, a power plant mounted on said chute, and means drivingly connecting said power plant to one of said shafts to draw said conveyor belt in a direction such that the lower portion of said belt moves in a direction from the inlet to the discharge end of said chute, said chute comprising a pair of spaced apart, substantially parallel side walls, a top wall extending along the upper edges of said side walls adjacent the discharge end of said chute, and a bottom wall including a relatively fixed portion secured to said side walls adjacent the discharge end of said chute, at least one movable portion hinged to the end of said fixed portion remote from the discharge end of said chute and detachably secured to said side walls, and a lip on the end of said bottom wall remote from the discharge end of said chute, said lip being inclined downwardly and toward the inlet end of said chute.

3. A portable conveyor comprising a rectangular chute having an inlet end and a discharge end, shafts extending transversely through said chute, one near the inlet and one near the discharge end of the latter, a pair of sprockets on each shaft, an endless conveyor belt disposed around said sprockets and supported thereby, a power plant mounted on said chute, and means drivingly connecting said power plant to one of said shafts to draw said conveyor belt in a direction such that the lower portion of said belt moves in a direction from the inlet to the discharge end of said chute, said chute comprising a pair of spaced apart, substantially parallel side walls each having an arcuate slot therein adjacent one end of said chute, said slots receiving the ends of the corresponding shafts, respective curved arms each pivoted at one end to a chute side wall adjacent the slot in the latter, and having respective shaft bearings thereon, means interconnected between each curved arm and the corresponding side wall to adjustably position said arms for regulating the tension on said conveyor belt, a top wall extending the top edges of said side walls from the discharge end of said chute, a part of the length of said side walls, and a bottom wall extending from the discharge end of said chute along the bottom edges of said side walls to a location intermediate the ends of said chute.

4. A portable conveyor comprising a chute having an inlet end and a discharge end adapted for insertion into a granary containing grain, said chute being provided with an opening in the bottom thereof extending from the inlet end inwardly to a point spaced from the discharge end thereof, a longitudinally extending endless conveyor positioned within said chute and mounted in said chute for rotation about horizontal axes, and means operatively connected to one of said axes for driving said conveyor in a direction such that the lower run moves in a direction from the inlet to the discharge end of said chute, the lower run of said conveyor in its course of movement from the inlet toward the discharge end projecting through the opening in the bottom wall of said chute to thereby excavate the grain adjacent thereto and convey the same toward and out of the discharge end of the chute.

WALTER J. GIESE.

REFERENCES CITED

The following references are of record in the file of this patent:

UNITED STATES PATENTS

| Number | Name | Date |
|---|---|---|
| 525,635 | Trevithick | Sept. 4, 1894 |
| 1,100,897 | Makowski | June 23, 1914 |
| 1,230,374 | Brown et al. | June 19, 1917 |
| 2,332,729 | Klosterman | Oct. 26, 1943 |
| 2,378,658 | Rensch | June 19, 1945 |
| 2,401,465 | Cwicig | June 4, 1946 |
| 2,410,996 | Patterson | Nov. 12, 1946 |
| 2,458,031 | Rome | Jan. 4, 1949 |